United States Patent [19]

Yamazaki et al.

[11] Patent Number: 4,832,456
[45] Date of Patent: May 23, 1989

[54] LIQUID CRYSTAL DISC MEMORY WITH CIRCULAR GROOVES FOR AUTO-FOCUSING OF WRITE-IN BEAM

[75] Inventors: Shunpei Yamazaki, Tokyo; Takeshi Mizunuma, Sagamihara, both of Japan

[73] Assignee: Semiconductor Energy Laboratory Co., Ltd., Kanagawa, Japan

[21] Appl. No.: 17,091

[22] Filed: Feb. 20, 1987

[30] Foreign Application Priority Data

| Mar. 4, 1986 [JP] | Japan | 61-46865 |
| Mar. 4, 1986 [JP] | Japan | 61-46866 |
| Mar. 5, 1986 [JP] | Japan | 61-47890 |
| Jul. 23, 1986 [JP] | Japan | 61-174274 |

[51] Int. Cl.⁴ .............................................. G02F 1/13
[52] U.S. Cl. ............................. 350/334; 350/331 R; 350/350 S; 350/339 R; 365/108; 365/114; 369/111; 369/275; 369/284; 357/7
[58] Field of Search ............... 350/342, 341, 339 R, 350/331 R, 350 S, 334, 344; 365/108, 114; 369/111, 109, 275, 284, 288; 357/23.5, 1, 7

[56] References Cited

U.S. PATENT DOCUMENTS

| 3,730,607 | 5/1973 | Grabmaier et al. | 350/339 R |
| 3,787,110 | 1/1974 | Berreman et al. | 350/341 |
| 3,878,549 | 4/1975 | Yamazaki et al. | 357/23.5 |
| 4,160,270 | 7/1979 | Goldschmidt et al. | 369/110 |
| 4,264,149 | 4/1981 | Zwart et al. | 350/339 R |
| 4,367,924 | 4/1981 | Clark et al. | 350/350 S |
| 4,405,993 | 9/1983 | Kahn et al. | 350/331 R |
| 4,443,064 | 4/1984 | Grinberg et al. | 350/342 |
| 4,720,173 | 1/1988 | Okada et al. | 350/344 X |

FOREIGN PATENT DOCUMENTS 0115915 6/1985 Japan ............................... 350/350 S

OTHER PUBLICATIONS

Brody et al. "A 6X6 Inch 20 Lines-Per-Inch Liquid-Crystal Display Panel" IEEE Trans. On Elec. Dev. vol. ED-20, No. 11, pp. 995-1001.

Primary Examiner—Stanley D. Miller
Assistant Examiner—Richard Gallivan
Attorney, Agent, or Firm—Gerald J. Ferguson, Jr.

[57] ABSTRACT

An improved optical memory disc is disclosed which has a liquid crystal layer on which information is written by applying electric field. The liquid crystal layer is sectioned into a plurality of concentric tracks by concentric grooves. When information is written or read, an auto-tracking method can implemented by aid of the grooves.

12 Claims, 6 Drawing Sheets

F I G. I

LIQUID CRYSTAL DISC MEMORY WITH CIRCULAR GROOVES FOR AUTO-FOCUSING OF WRITE-IN BEAM

BACKGROUND OF THE INVENTION

The invention relates to liquid crystal disc memories, more particularly relates to erasable optical memories device.

Hitherto there have been known an optical read-only memory device with a reflective surface on which information is written in the form of sequence of depressions. The memory device of this type is expected as promising for applications for audio devices, video appliance and so on. However, information on the device can not be rewritten.

On the other hand it has been proposed, as memory devices capable of being rewritten, magneto-optical memory devices and optical disc memories with chalcogen amorphous semiconductor. The magneto-optical devices, however, must be manufactured using very expensive and rare material and therefore might not be suitable for mass-production. The optical system for the optical disc memory, in turn, is complicated.

SUMMARY OF THE INVENTION

It is therefore an object of the invention to provide an optical disc memory on which information can be rewritten.

It is another object of the invention to provide an improved liquid crystal optical disc memory of a non-volatile type.

It is another object of the invention to provide an optical disc memory with a liquid crystal in which cross-talking is unlikely.

DETAILED DESCRIPTION OF THE DRAWINGS

FIGS. 3(A) through 3(D) are partial sections view showing other embodiments of the invention.

Figure 4:
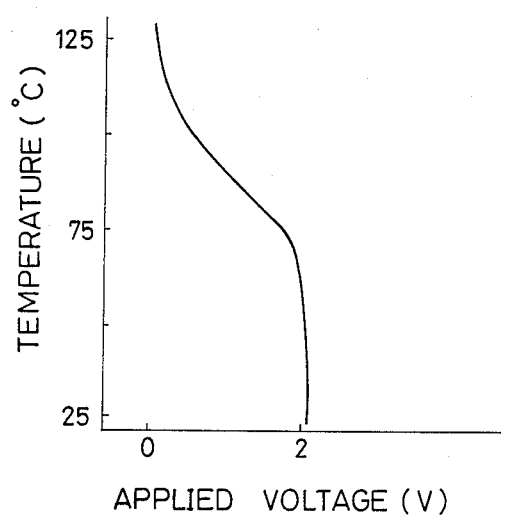

FIG. 4 is a graphical diagram showing the coersive voltage with reference to the temperature of the ferroelectric substance.

FIGS. 5(A) through 5(D) are cross section views showing other embodiments of another type in accordance with the invention.

Figure 6A:
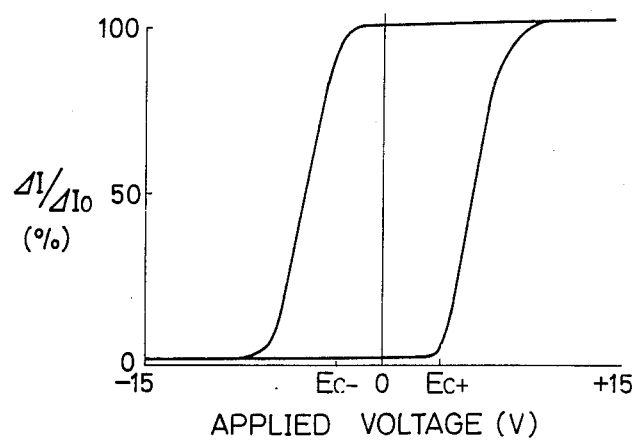

FIG. 6(A) is a graphical diagram showing the hysteresis loop of a disc memory according to the invention.

Figure 6B:
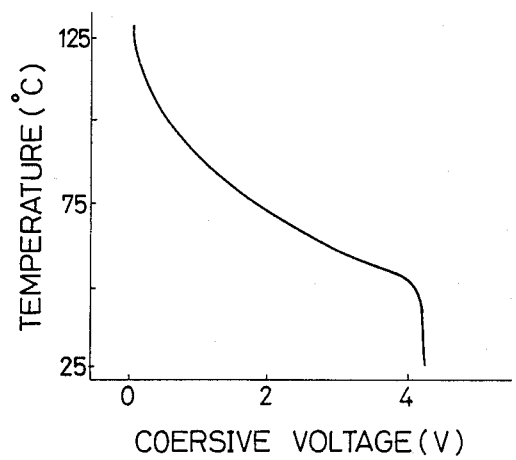

FIG. 6(B) is a graphical view showing the coersive voltage of a disc memory according to the invention with reference to the temperature of the ferroelectric layer.

DETAILED DESCRIPTION OF THE PREFERRED EMBODIMENTS

Figure 1:
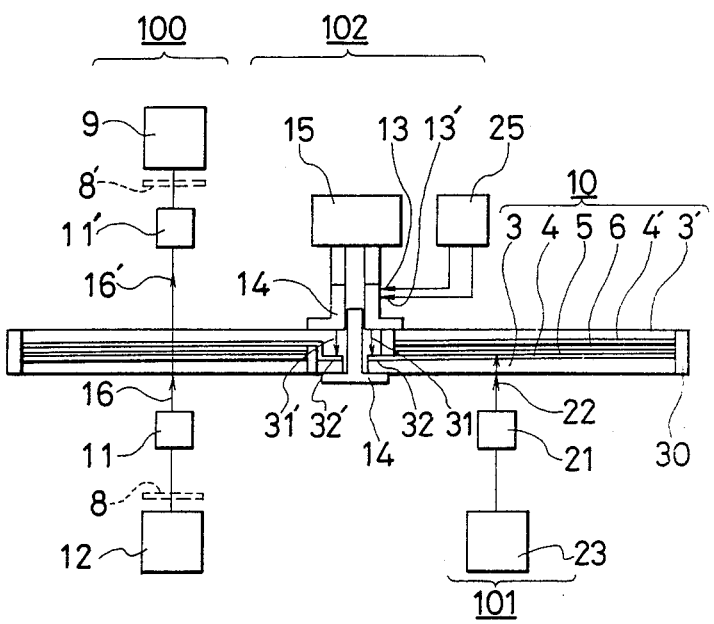
FIG. 1 is a cross section view showing an embodiment of the invention.

Referring now to FIG. 1, an embodiment of the invention is illustrated. An information recording system is comprised of a first system 100 for reading information, a second system 101 for writing information and a third system 102 for erasing information. Information is to be written on an optical disc 10.

The optical disc is comprised of a pair of transparent circular substrates 3 and 3' whose inside surfaces are provided with a pair of transparent electrodes 4 and 4'.

On the transparent electrode 4 is a non-volatile layer (NVL) 5 made of ferroelectric substance.

Figure 2:
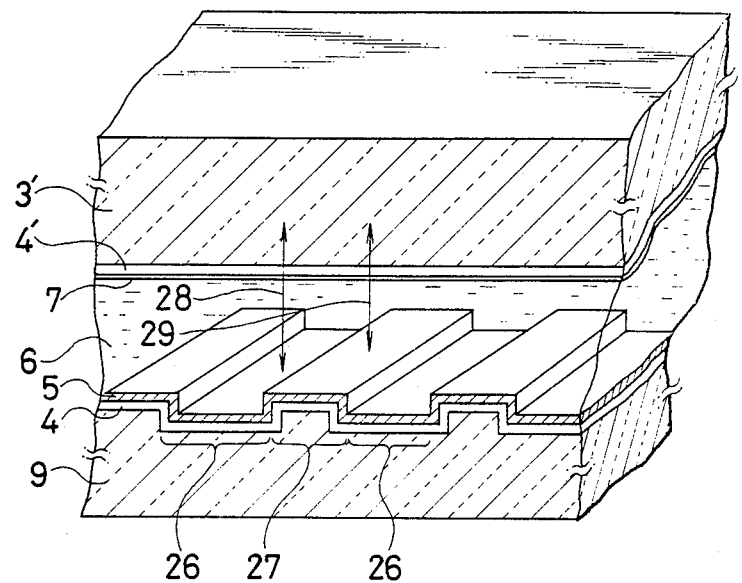
FIG. 2 is an expanded section view showing a part of the embodiment of the invention.

FIG. 2 is an expanded perspective section view of the disc along a radius of the disc. In the FIGURE, concentric grooves are formed on the inside of the substrate 3' on which are formed the electrode 4 and the NVL 5. The inside surface of the other substrate 3' is even on which are formed the electrode 4' and an oriented film 7 made of an organic substance. A twisted or supertwisted nematic liquid crystal layer is disposed between the oriented film and the NVL 5. The thickness of the liquid crystal layer is less than 4 microns, preferably, 0.5 to 2 microns. Between the substrates 3 and 3' are defined tracks 26 for writing and tracks 27 for guidance along the grooves, where the electric field applied on the liquid crystal is stronger on the track 27 than on the track 26 because the thickness of the liquid crystal layer on the tracks 27 is thinner than on the track 26. Information is written on the liquid crystal layer in terms of a binary code along each track 26 which has about 0.5 micron in width. The groove prevents cross-talk between the adjacent tracks 26. Laser beam 22 for (re)writing and laser beam 16 for reading scan only the track 27 for writing by means of an auto-focus servo systems 21, 11 which keep the beam focused on the track 27 for writing and also simultaneously rectify diversion of the scanning by means of the grooves, whereby, in an event that the beam comes away from the track 22 for rewrite, the servo system can correct the scanning by the track 26 for guide.

In advance of writing, an electric field higher than the coersive field of the NVL 5 is applied to the liquid crystal layer 6 between the electrode 4 and 4' through the erasing system 102 to make a homeotropic phase throughout the liquid crystal layer 6. The liquid crystal layer in a homeotropic phase does not rotates the plane of polarization of light passing therethrough. The homeotropic phase remains even after removing the application of electric field because of the spontaneous polarization of the NVL(ferroelectric layer) 5. Namely the electric field induced by the NVL 5 sustains the liquid crystal layer in the homeotropic phase. In this embodiment both the contiguous surfaces of the substrate to the liquid crystal layer must be oriented perpendicular to each other, To write information on the liquid crystal layer, the optical disc is irradiated with infrared light having 1 to 3 microns in wavelength from a light source 23 through the autofocus system 21 and the infrared light scans the track 27, intermittently heating the NVL 5 on the track 27. Because the coersive voltage of the NVL 5 decreases with a rising temperature as shown in FIG. 4, the spontaneous polarization of the heated portion of the NVL 5 decays whereupon the liquid crystal losses its external electric field and is released into a homogeneous phase. In consequence, information is written in terms of two phases of the liquid crystal layer 6, homeotropic and homogeneous phases.

When information on the disc is read out, laser beam 16 polarized by a polarizing plate 8 is radiated from the semiconductor layer through the auto-focus system 11 and passes through the optical disc. The plate of polarization of the laser beam passing through the disc is rotated by the liquid crystal in homogeneous phase while allowed to pass with the polarization as it is by the liquid crystal in homeotropic phase. The output laser beam from the disc is filtered by a polarizing plate 8' and received by a photo sensor 9. The input to the photosensor 9 in a pulse or non-pulse corresponds to the phase of the liquid crystal.

The optical disc 10 is provided with sealing structure 30 and 30' for preventing the liquid crystal therein from making contact with air. On the central portion of the disc 10 are formed external contacts 32 and 32' which are elongated inward from the pair of the electrodes 4 and 4a. The contacts 32 and 32' come into contact with terminals 31 and 31' when the disc 10 is integrated by a jig 14 and 14'. The jig 14 and 14', in turn, can be connected with leads 13 and 13' from a voltage source 25 when an voltage application is desired. Of course the leads slide on the jig, but tolerable structure is prepared on the sliding portion. The connection between the contacts 32 and 32' and the terminals 31 and 31' is made simultaneously when the disc 10 is integrated by the jig 14 and 14', and therefore no sliding takes place on the contacts 32 and 32'.

Figure 3A:
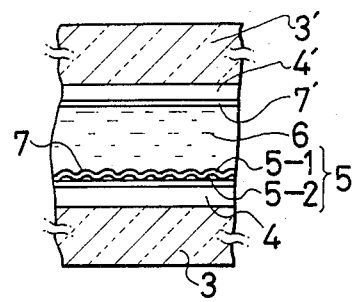

In FIG. 3(A) is shown a second embodiment of the invention. This embodiment is further provided with "clusters" 5-1 of a conductor or a semiconductor on the ferroelectric layer 5. The term "clusters" expresses, in this description, distribution of island-shaped (semi)conductors electrically floating on the layer 5-1. The clusters are preferably made of transparent material such as indium tin oxide, zinc oxide, tin oxide, antimony oxide, amorphous silicon, amorphous $Si_xC_{1-x}(0'x\leq1)$ or $Si_3N_{4-x}(0.5<x<4)$. The clusters helps, as a charge storage region, the ferroelectric layer 5 to sustain the liquid crystal layer in homeotropic phase. Other construction is same as the first embodiment.

Figure 3B:
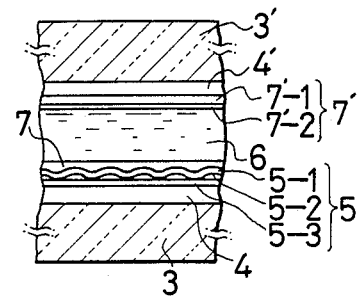

In FIG. 3(B) is shown a third embodiment of the invention. In this embodiment, semiconductor clusters 5-2 with 300 to 1000 Å in average thickness and a pair of silicon nitride layers 5-1 and 5-3 with 50 to 150 Å and 50 to 1000 Å respectively in average thickness on the both sides of the clusters 5-2. The clusters store positive or negative charge introduced through the silicon nitride layer when electric field is induced between the electrode 4 and 4'. In absence of the application of electric field, the silicon nitride layer serves as an insulator which blocks escape of the charge accumulated in the cluster 5-2. Information can be written on the disc by releasing the charge from the clusters by irradiation of light on the cluster on the predetermined address of the disc.

Figure 3C:
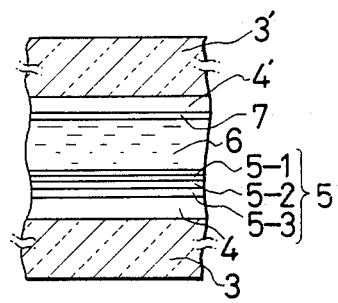

In FIG. 3(C) is shown a fourth embodiment of the invention. This embodiment is a variation of the third embodiment. As illustrated in the Figure, a semiconductor region 5-2 is made in the form of a layer instead of clusters. The semiconductor layer 5-2 is transmissive with reference to laser light for reading with 700 to 900 nm in wavelength.

Figure 3D:
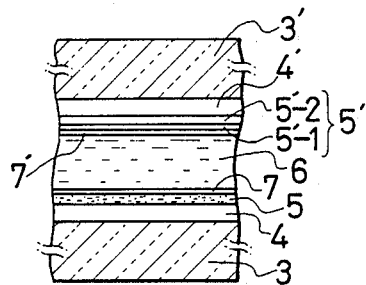

In FIG. 3(D) is a fifth embodiment of the invention. Between the organic oriented film 7 and the electrode 4 are a silicon nitride $(Si_3N_{4-x})$ layer 5 which is heavily doped with impurity and thereby abundant in dangling bonds which can store electric charge. Also on the other side are provided a dielectric layer 5'-2 and a transparent charge storage layer 5'-1. The opposed insides contiguous to the liquid crystal layer 6 are oriented film 7 and 7'.

Referring again to FIG. 1, another type of an optical memory disc is explained as a sixth embodiment. The liquid crystal layer according to this embodiment is of ferroelectric smectic chiral. The chiral smectic liquid crystal is inserted at a high temperature between the substrates which have a contiguous surface oriented in a certain direction, and is gradually cooled to obtain an aligned condition of the liquid crystal. In the liquid crystal of this type molecules are arranged in parallel to the surface of the substrate contiguous to the liquid crystal. The axes of the molecules are aligned in one direction by applying electric field perpendicular to the layer, exhibiting absorption anisotropy to incident light. The direction of the axes can be changed reversing the sense of the applied field. The half of the angle between the two direction is called a tilted angle. This behavior of the liquid crystal is discussed in detail in U.S. Pat. No. 4,367,942.

In advance of writing, an electric field higher than the coersive field of the NVL 5, e.g., 15 V is applied to the liquid crystal layer 6 between the electrode 4 and 4' through the erasing system 102 to orientate the molecules. The molecules certainly remain with their axes in one direction even after removing the application of electric field because of the NVL (ferroelectric layer) 5 which comes to have spontaneous polarization by the electric field application. Namely the electric field induced by the NVL 5 fixes the direction of the moleculars and constitutes a non-volatile memory. Unlike the system in previous embodiments with nematic liquid crystal, however, the ferroelectric layer 5 is not absolutely indispensible in this case. The direction of the liquid crystal molecules is also sustained by the contiguous surface because the liquid crystal in contact with the surface is on local minimum in free energy when the molecules are in parallel with the surface.

To write information on the liquid crystal layer, the optical disc is irradiated with a laser beam having a short wavelength from a light source 23 such as an Ar laser, under existence of reverse electric field, intermittently heating the NVL 5 and the liquid crystal on the track 27 under application of a reverse electric field. The liquid crystal being heated is energized and the molecules are rotated by 180° following the reverse voltage while the spontaneous polarization is neutralized on the predetermined address.

When information on the disc is read, laser beam 16 polarized by the polarizing plate 8 is radiated through the autofocus system 11 and passes through the optical disc. The polarizing plate is disposed so that the direction of polarization is parallel or perpendicular to the direction of the liquid crystal molecules. Namely the optical disc selectively allows the laser beam to pass therethrough in accordance with the direction of the liquid crystal molecules on the address. And the photosensor decodes the written information through the detection of the beam passing through the disc 10. In this embodiment one of the polarizing plates 8 and 8' can be omitted. When the polarizing plate 8 is dispensed with, laser beam incident on the disc might not be polarized light but is polarized by the disc in either direction of an orthogonal set (in case with 45° in tilted angle), and thereafter the direction of polarization is detected by the photosenser through the polarizing plate 8'.

Figure 5A:
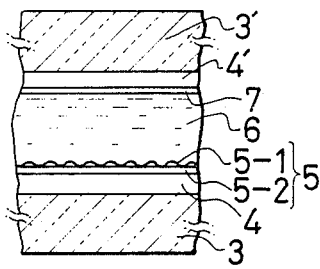

In FIG. 5(A) is shown a seventh embodiment of the invention. This embodiment is further provided with clusters 5-1 of a conductor or a semiconductor on the ferroelectric layer 5. The clusters are preferably made of transparent material such as indium tin oxide, zinc oxide, tin oxide, antimony oxide, amorphous silicon, amorphous $Si_xC_{1-x}(0<x\leq1)$ or $Si_3N_{4-x}(0.5<x<4)$. The clusters help, as a charge storage region, the ferroelectric layer 5 to sustain the liquid crystal layer in a fixed molecular direction. The ferroelectric layer is made of copolymer of vinylidenefloride($CH_2CF_2$, called VDF) and tetrafloroethylene ($CF_2CF_2$) diluted with methylethylketone at 10 weight %. The copolymer is coated on the electrode by a spining method. The thickness of the layer is controlled by changing the rotation number and the dilution degree of the copolymer. After the coating, the disc is heated to evaporate unnecessary material and to help crystallize the copolymer. Consequently the ferroelectric layer is formed with 100-5000 Å, e.g., 1000 Å in thickness. On the other electrode 4', another ferroelectric layer may be formed with vinylidenechloride ($CH_2CCl_2$), or copolymer of VDF and trifloroethylene ($TrFE_2$). Other construction is same as the first embodiment.

The hysteresis loop of the embodiment is illustrated in FIG. 6(A) on which the transmissivity of the disc is plotted against the applied voltage to the disc. The coersive voltage Ec shifts with the temperature as shown in FIG. 6(B). For instance, the application of 2 V less than Ec at a room temperature becomes an application of voltage beyond the Ec when heated to 80° C.

Figure 5B:
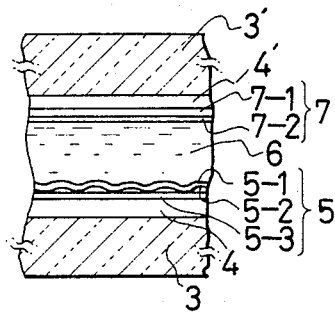

In FIG. 5(B) is shown an eighth embodiment of the invention. In this embodiment, semiconductor clusters 5-2 with 300 to 1000 Å in average thickness and a pair of silicon nitride layers 5-1 and 5-3 with 50 to 150 Å and 50 to 1000 Å respectively in average thickness on the both sides of the clusters 5-2. The clusters store positive or negative charge introduced through the silicon nitride layer when electric field is applied by the electrode 4 and 4'. In absence of the application of electric field, the silicon nitride layer serves as an insulator which blocks escape of the charge accumulated in the cluster 5-2. Information can be written on the disc by selectively releasing the charge form the clusters by irradiation of light on the cluster on the predetermined address of the disc.

Figure 5C:
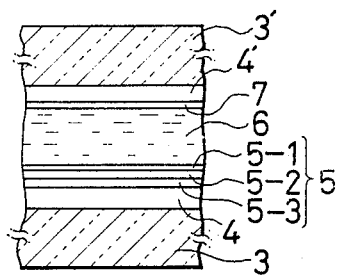

In FIG. 5(C) is shown a ninth embodiment of the invention. This embodiment is a variation of the eighth embodiment. As illustrated in the Figure, a semiconductor region 5-2 is made in the form of a layer instead of clusters. The semiconductor layer 5-2 is transmissive with reference to laser light for reading with 700 to 900 nm in wavelength.

Figure 5D:
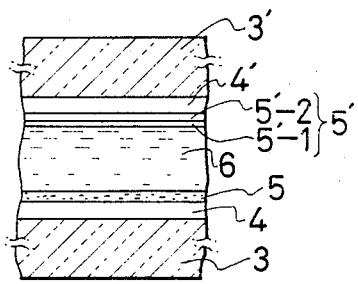

In FIG. 5(D) is a tenth embodiment of the invention. On the electrode 4 is a silicon nitride ($Si_3N_{4-x}$) layer 5 which is heavily doped with impurity and thereby abundant in dangling bonds which can store electric charge. Also on the other side are provided a dielectric layer 5'-2 and a transparent charge storage layer 5'-1.

The present invention should not be limited to the above disclosed particular embodiments and many variations can occur to those skilled in the art as below.

As a smectic liquid crystal, another liquid crystal can be used, for example, such disclosed by J. W. Goodby, "Ferroelectrics Switching in the tilted Smectic Phase of R-C-3-4-n-Hexyloxydenzylinde- 4'-Am'no-(2-Chloropropyl)Cinnamate(HOBACPC)", pp. 126-136, Ferroelectrics Vol. 59 (1984), or Japanese patent disclosures Nos. sho59-98051 and sho59-118744.

In the above embodiments, the grooves sectioning the radius of the liquid crystal into a parallel tracks are prepared in the form of concentric circles. However, the grooves are formed to be a spiral. Namely the grooves are continuously connected with each other.

What is claimed is:

1. A liquid crystal non-volatile disc memory comprising:
    a pair of circular substrates at least one of which is transparent;
    a ferroelectric liquid crystal layer disposed between said substrates;
    a plurality of circular grooves by which memory domains are sectioned in the radial direction of said substrates and which aid the molecules of said liquid crystal layer to be aligned in the circumferential direction, and
    writing means for writing information into said liquid crystal layer in terms of the two states of (a) the anisotropic absorption in the circumferential direction and (b) the anisotropic absorption in the direction forming double the tilted angle of the liquid crystal, the writing means including means for imposing on the liquid crystal layer an electric field in either direction normal to the liquid crystal layer to change the two states;
    wherein the circular regions between adjacent grooves constitute tracks for writing on which information is written in terms of said optical characteristics and where the grooves constitute auto-focus tracks to maintain the writing on the circular regions for writing.

2. A liquid crystal non-volatile disc memory comprising:
    a pair of circular substrates at least one of which is transparent;
    a ferroelectric liquid crystal layer disposed between said substrates;
    a plurality of circular grooves by which memory domains are sectioned in the radial direction of said substrates and which aid the molecules of said liquid crystal layer to be aligned in the circumferential direction, and
    writing means for writing information into said liquid crystal layer in terms of the two states of (a) the anisotropic absorption in the circumferential direction and (b) the anisotropic absorption in the direction forming double the tilted angle of the liquid crystal, the writing means including means for imposing on the liquid crystal layer an electric field in either direction normal to the liquid crystal layer to change the two states;
    wherein said grooves constitute tracks for writing on which information is written in terms of said optical characteristics and where the circular regions between adjacent grooves constitute auto-focus tracks to maintain the writing on the tracks for writing.

3. A memory of claims 1 or 2 wherein said grooves are formed on concentric circles.

4. A memory of claims 1 or 2 wherein said grooves interconnect to make a spiral.

5. A memory of claims 1 or 2 wherein said ferroelectric liquid crystal layer includes a ferroelectric layer adjacent to a liquid crystal where the ferroelectric layer is subjected to said electric field.

6. A memory of claims 1 or 2 including means including a charge storage region and an insulator which allows carriers to pass therethrough into said storage region only when said external electric field is applied and blocks escape of the carriers stored in said storage region.

7. A memory of claim 6 wherein said storage region is made of silicon nitride heavily doped with dangling bonds.

8. A memory of claim 6 wherein said storage region is made of semiconductor.

9. A memory of claim 8 wherein said semiconductor layer is heavily doped with impurity.

10. A memory of claim 8 wherein said storage region is provided in the form of clusters of the storage region material.

11. A memory of claims 1 or 2 further comprising a pair of electrodes provided on said substrates.

12. A memory of claim 11 integrated by a jig having inner terminals in contact with said electrodes and external pads connected with said terminals.

* * * * *